(12) United States Patent
Ikuta et al.

(10) Patent No.: US 10,659,641 B2
(45) Date of Patent: May 19, 2020

(54) IMAGE FORMING APPARATUS, CONDITION DETERMINATION METHOD, AND COMPUTER PROGRAM

(71) Applicant: Konica Minolta, Inc., Chiyoda-ku, Tokyo (JP)

(72) Inventors: Katsuyuki Ikuta, Hamamatsu (JP); Masahiro Kamiya, Toyohashi (JP); Shota Igo, Toyokawa (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 16/409,492

(22) Filed: May 10, 2019

(65) Prior Publication Data

US 2019/0373124 A1 Dec. 5, 2019

(30) Foreign Application Priority Data

May 29, 2018 (JP) ................................. 2018-102239

(51) Int. Cl.
*G06F 3/12* (2006.01)
*H04N 1/00* (2006.01)

(52) U.S. Cl.
CPC ..... *H04N 1/00724* (2013.01); *H04N 1/00726* (2013.01); *H04N 1/00795* (2013.01)

(58) Field of Classification Search
CPC .......... H04N 1/00724; H04N 1/00726; H04N 1/00729; H04N 1/00795; H04N 1/00801; H04N 1/00806
See application file for complete search history.

(56) References Cited

U.S. PATENT DOCUMENTS

| 2010/0172663 | A1* | 7/2010 | Nakai | G03G 15/5029 399/45 |
| 2012/0201547 | A1* | 8/2012 | Yamashina | G03G 15/2039 399/15 |
| 2016/0378414 | A1* | 12/2016 | Oya | G06F 3/121 358/1.15 |

FOREIGN PATENT DOCUMENTS

| JP | 2007-058084 A | 3/2007 |
| JP | 2008-225052 A | 9/2008 |

* cited by examiner

*Primary Examiner* — Moustapha Diaby
(74) *Attorney, Agent, or Firm* — BakerHostetler

(57) ABSTRACT

Disclosed is an image forming apparatus, which may execute a job including printing an image. The disclosed image forming apparatus may include: a printer; a detector that may detect a property of a printing paper sheet, the printing paper sheet being a paper sheet used by the printer in the printing; and a determinator that may, on the basis of the property detected by the detector and a situation of the job, determine conditions for executing the printing.

13 Claims, 12 Drawing Sheets

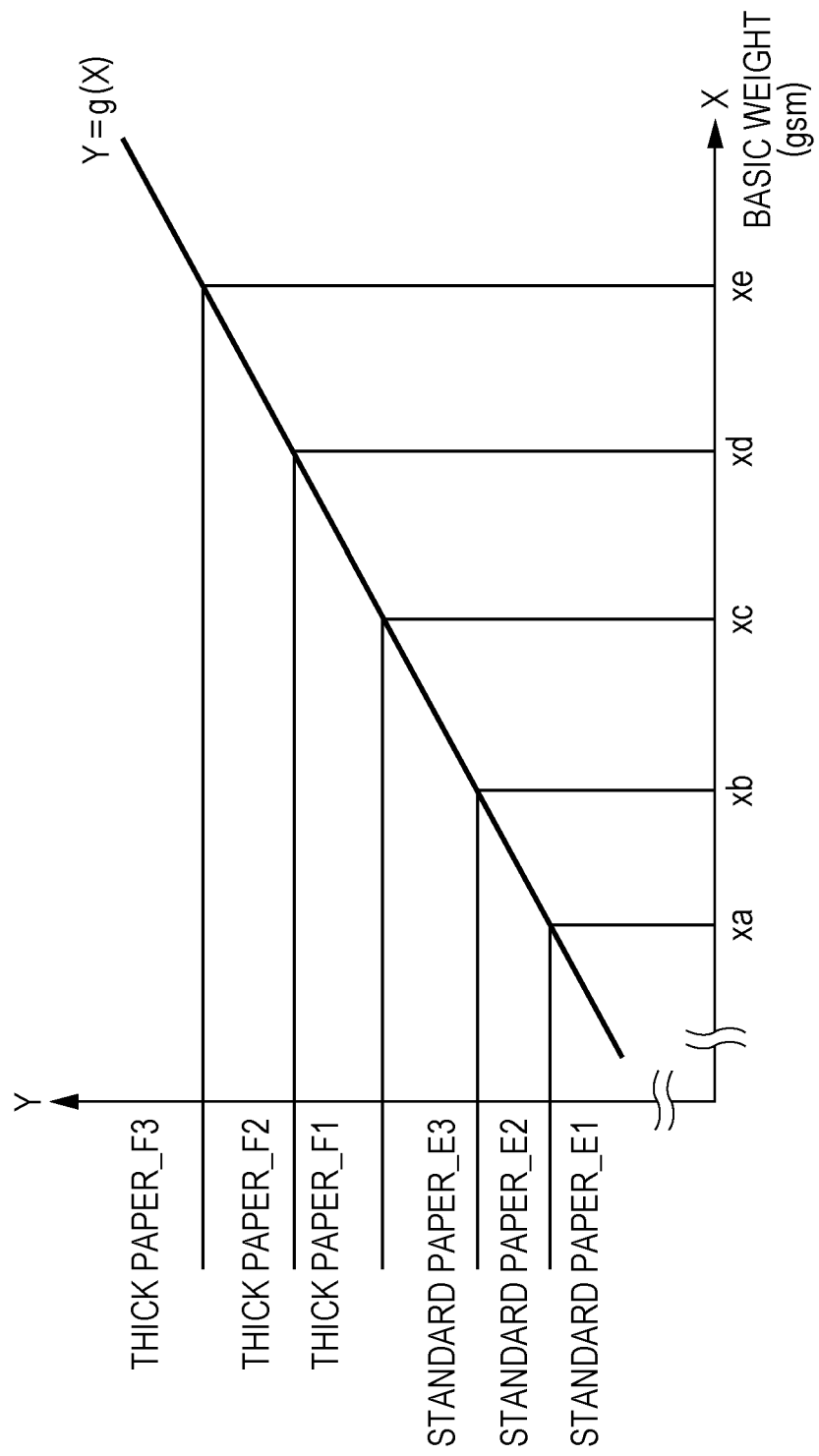

| KIND | PREFERABLE FIXING TEMPERATURE (°C) | PREFERABLE IMAGE PARAMETER (%) | PREFERABLE TRANSPORT SPEED (m/s) | MAXIMUM NUMBER OF STAPLED SHEETS (SHEETS) | MAXIMUM NUMBER OF PUNCHED SHEETS (SHEETS) | MAXIMUM NUMBER OF FOLDED SHEETS (SHEETS) |
|---|---|---|---|---|---|---|
| STANDARD PAPER_E1 | T1 | U1 | P1 | Ma1 | Mb1 | Mc1 |
| STANDARD PAPER_E2 | T2 | U2 | P2 | Ma2 | Mb2 | Mc2 |
| STANDARD PAPER_E3 | T3 | U3 | P3 | Ma3 | Mb3 | Mc3 |
| THICK PAPER_F1 | T4 | U4 | P4 | Ma4 | Mb4 | Mc4 |
| THICK PAPER_F2 | T5 | U5 | P5 | Ma5 | Mb5 | Mc5 |
| THICK PAPER_F3 | T6 | U6 | P6 | Ma6 | Mb6 | Mc6 |

IMAGE FORMING APPARATUS, CONDITION DETERMINATION METHOD, AND COMPUTER PROGRAM

CROSS REFERENCE TO RELATED APPLICATIONS

This application claims priority to Japanese patent Application No. 2018-102239, filed on May 29, 2018, which is incorporated herein by reference in its entirety.

BACKGROUND

Technological Field

The present disclosure relates to a technology for determining conditions of a printer or the like of an image forming apparatus.

Description of the Related Art

As a paper sheet on which an image forming apparatus prints an image, various kinds of paper sheets are used. In order to obtain a higher quality printed matter, it is preferable that the transport speed of a paper sheet, the temperature of a fixing roller or the like is set according to a kind of paper sheet.

Therefore, conventionally, an image forming apparatus allows a user to input a kind of paper sheet, and sets the speed, the temperature or the like described above according to the input kind.

However, the user often does not know the kind of paper sheet, or may forget to input the kind. In another case, the user may decide not to input the kind on purpose because the user finds the input operation troublesome.

Accordingly, there is proposed a technology in which a sensor for detecting a kind of paper sheet is provided in an image forming apparatus, and the transport speed, the temperature of a fixing roller, or the like is set according to the kind detected by the sensor.

According to the technology disclosed in JP 2008-225052 A, whether or not a paper-kind stored value exists is determined at the start in paper feeding transport operation, and if a stored value exists, the stored value is compared with a data range of a paper-kind determination table so as to determine a paper kind. If no stored value exists, a paper-kind detector performs measurement. Measured data is stored in a temporary storing part as a temporarily stored value, the temporarily stored value is stored in a paper-kind storing part as a paper-kind stored value, and a paper kind is similarly determined. When determination conditions for clearing data are satisfied, a data clear part clears a paper-kind stored value of a paper feeding stage that performs corresponding paper feeding operation of the paper-kind storing part.

According to the technology disclosed in JP 2007-58084 A, a kind of recording material supplied is determined by a sensor, and according to a result of the determination, the control is performed so as to change conditions such as transport speed, fixing control temperature, and a transfer bias. However, in a case where a detection result falls within a detection boundary region (for example, a boundary between a thin paper mode and a standard paper mode), a user is made select a desired setting.

Conventionally, although the same kind of paper sheets are supplied from a paper feed tray to a printing unit, an error of measurement by a sensor, a change in ambient humidity, or the like may cause a detection result to differ depending on the timing According to the technology disclosed in JP 2007-58084 A, in such a case, a user is made select a desired setting. However, the user may find the selecting work troublesome. Accordingly, it is desirable that a kind be automatically detected.

However, for example, although a kind of supplied paper sheets is thick paper, if it is detected that the kind is standard paper, a malfunction may occur in a finisher. In other words, although an upper limit of thickness that allows stapling is exceeded, the finisher tries stapling. Consequently, there is a possibility that the finisher will fail in stapling, which causes the printed matter to be wasted, or causes the finisher to be damaged. The same applies to a case where post-processing other than stapling is performed.

In another case, although a kind of supplied paper sheets is standard paper, if it is detected that the kind is thick paper, there is a possibility that the productivity will become lower than that in the case of the true kind. This is because the transport speed for the thick paper is often set lower than the transport speed for the standard paper.

However, the conventional technologies as disclosed in JP 2008-225052 A and JP 2007-58084 A cannot solve such problems.

SUMMARY

The present disclosure has been made taking such problems into consideration, and an object of the present disclosure is, in a situation in which the result of detecting a kind easily changes although the same kind of paper sheets is used, to enable an image to be printed on a paper sheet, or to enable a printed matter to be subjected to post-processing, more satisfactorily than heretofore.

To achieve the abovementioned object, according to an aspect of the present disclosure, an image forming apparatus may execute a job including printing an image. The image forming apparatus may comprise: a printer; a detector that may detect a property of a printing paper sheet, the printing paper sheet being a paper sheet used by the printer in the printing; and a determinator that may, on the basis of the property detected by the detector and a situation of the job, determine conditions for executing the printing.

BRIEF DESCRIPTION OF THE DRAWINGS

The advantages and features provided by one or more embodiments of the disclosure will become more fully understood from the detailed description given hereinbelow and the appended drawings which are given by way of illustration only, and thus are not intended as a definition of the limits of the present disclosure:

FIG. 7 is a drawing illustrating an example of relationship among basic weight of paper sheet, kinds of paper sheet, and threshold values;

FIG. 8 is a drawing illustrating an example of environment data;

DETAILED DESCRIPTION OF EMBODIMENTS

Hereinafter, one or more embodiments of the present disclosure will be described with reference to the drawings. However, the scope of the disclosure is not limited to the disclosed embodiments.

Figure 1:
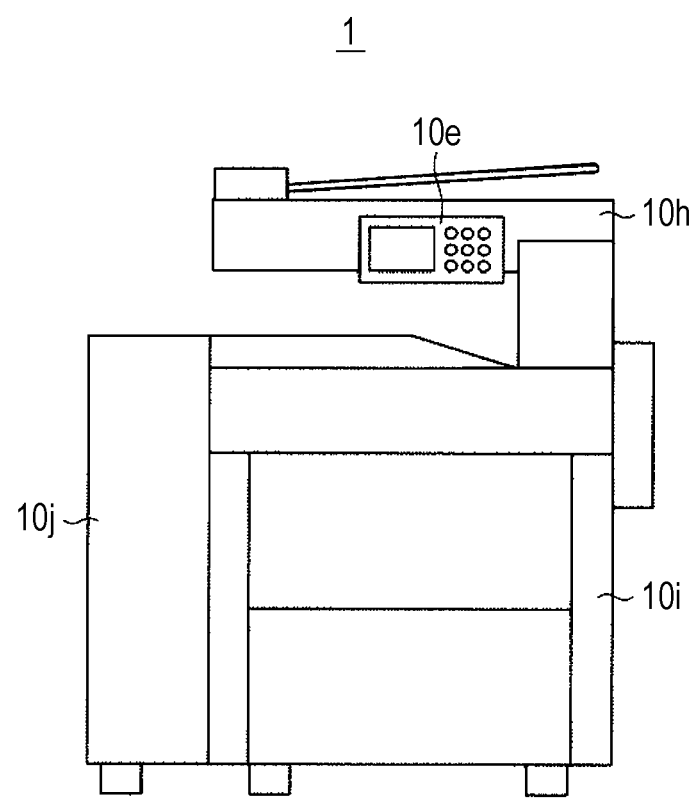
FIG. 1 is a drawing illustrating an example of an external appearance of an image forming apparatus.
Figure 2:
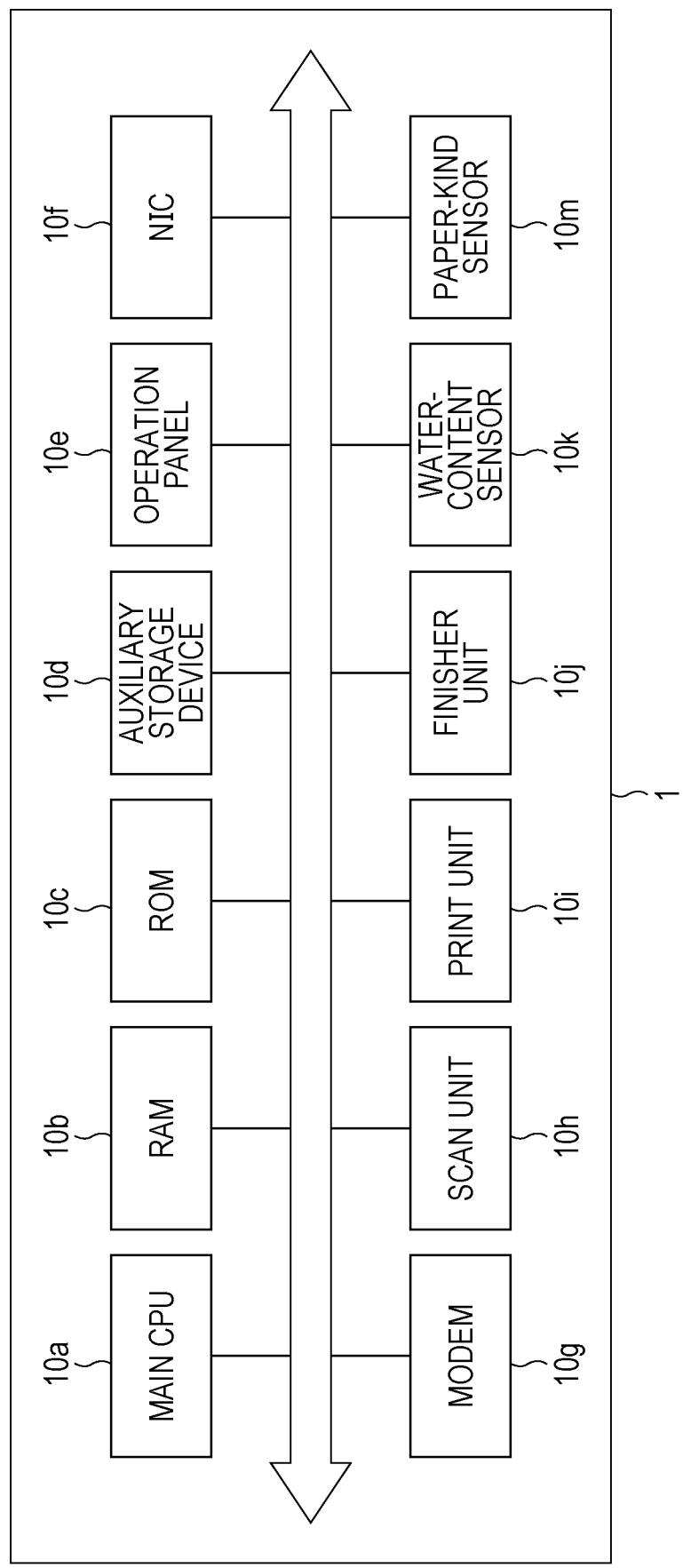
FIG. 2 is a diagram illustrating an example of a hardware configuration of the image forming apparatus.
Figure 3:
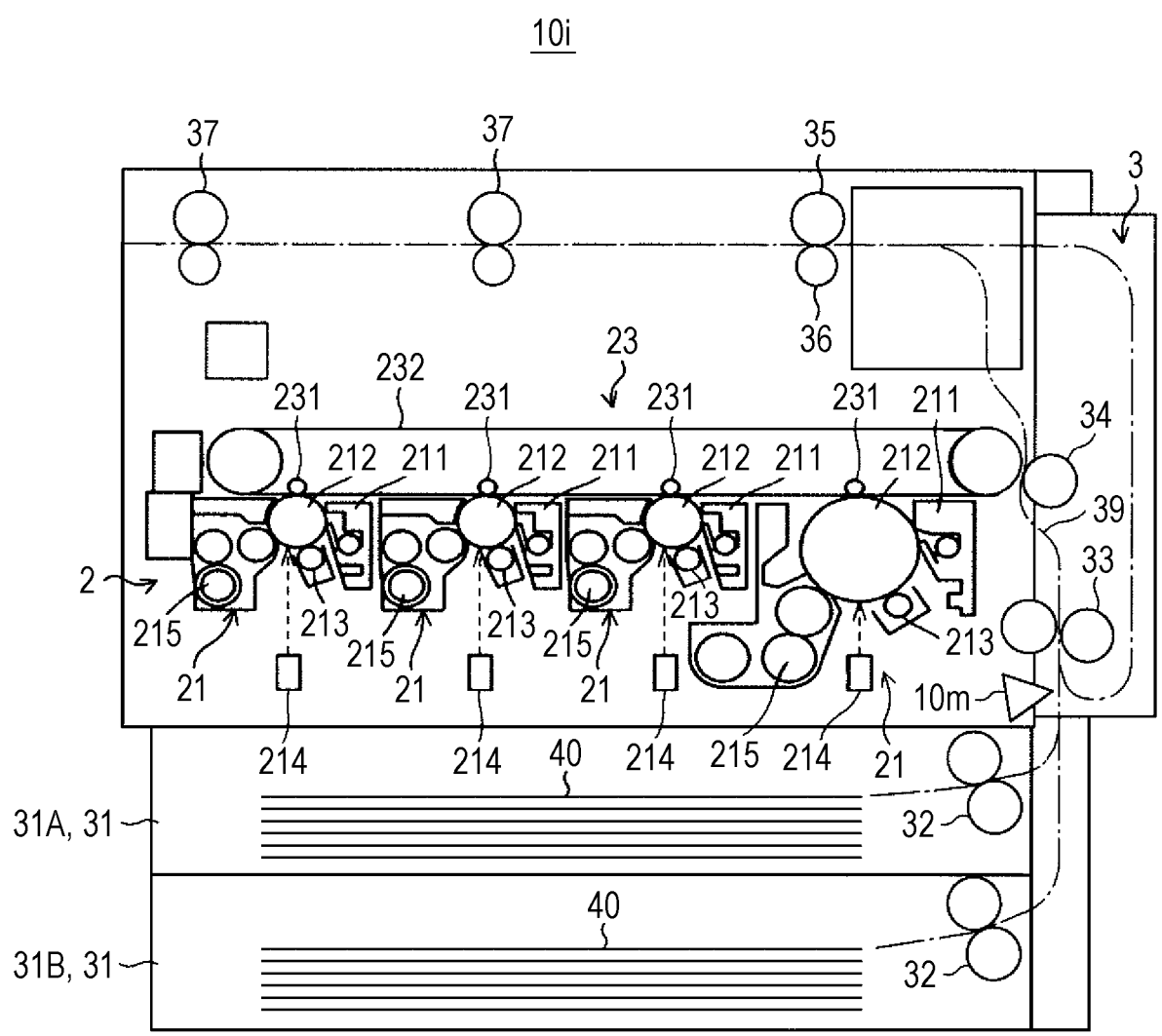
FIG. 3 is a drawing illustrating an example of a configuration of a print unit.
Figure 4A:
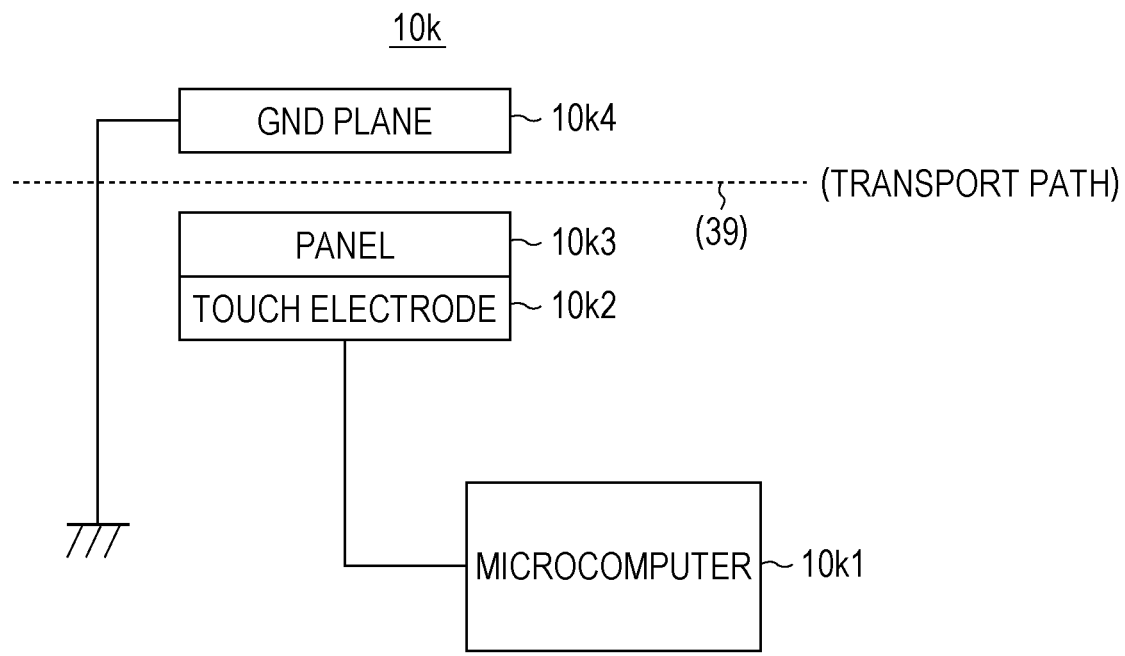
FIGS. 4A and 4B are diagrams each illustrating an example of a configuration of a water-content sensor.
Figure 4B:
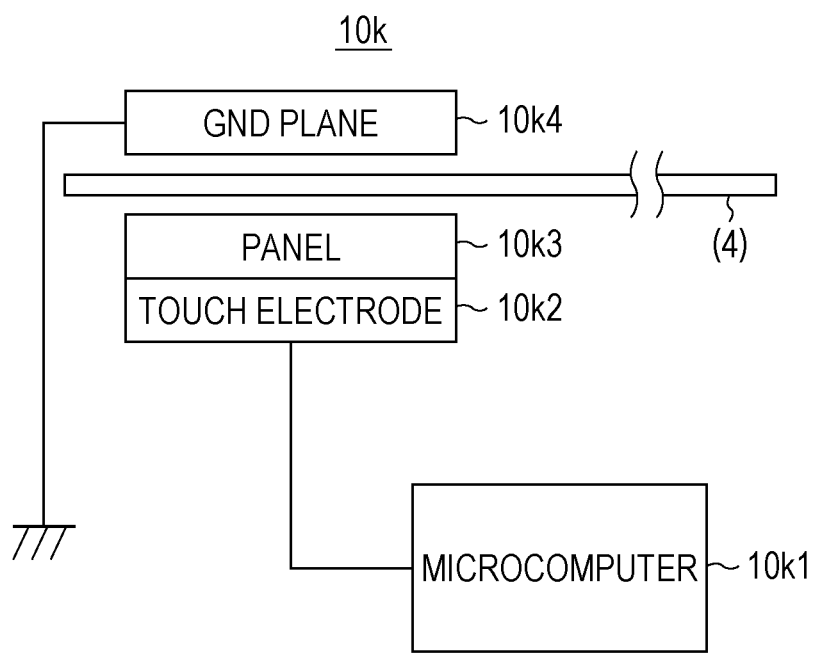

FIG. 1 is a drawing illustrating an example of an external appearance of an image forming apparatus 1. FIG. 2 is a diagram illustrating an example of a hardware configuration of the image forming apparatus 1. FIG. 3 is a drawing illustrating an example of a configuration of a print unit 10i. FIGS. 4A and 4B are diagrams each illustrating an example of a configuration of a water-content sensor 10k.

The image forming apparatus 1 shown in FIG. 1 is an apparatus that is generally called a "Multi Function Peripheral (MFP)" or a "multifunction machine", and is an apparatus into which functions such as a copy function, a PC print function, a facsimile function, a scanning function and a box function may be integrated.

The PC print function is what is called a function of receiving image data from a terminal device through a Local Area Network (LAN) line, and printing an image on a paper sheet. The PC print function may be called a "network printer function" or a "network printing function".

The box function is a function of providing a storage area called a "box", a "personal box" or the like on a user basis, and allowing each user to save and manage image data by using the user's own storage area. A box can also be provided on a group basis so as to be shared among group members. The box is equivalent to a "folder" or a "directory" in a personal computer.

As shown in FIG. 1 or FIG. 2, the image forming apparatus 1 is formed by a main Central Processing Unit (CPU) 10a, a Random Access Memory (RAM) 10b, a Read Only Memory (ROM) 10c, an auxiliary storage device 10d, an operation panel 10e, a Network Interface Card (NIC) 10f, a modem 10g, a scan unit 10h, a print unit 10i, a finisher unit 10j, a water-content sensor 10k, a paper-kind sensor 10m, and the like.

The operation panel 10e is formed by a key input part, a touch panel display, and the like.

The key input part is what is called a hardware keyboard, and is formed by ten-keys, a start key, a stop key, function keys, and the like.

The touch panel display displays, for example, a screen for giving a user a message or an instruction, a screen for allowing the user to input a kind of processing and processing conditions thereof, and a screen for showing a result of processing executed by the main CPU 10a or the like.

The NIC 10f communicates with a terminal device or a server through a communication line by using a protocol such as Transmission Control Protocol/Internet Protocol (TCP/IP).

The modem 10g exchanges image data with a facsimile terminal through a public telephone line by using a protocol such as G3.

The scan unit 10h reads an image printed on a medium that is set in an Auto Document Feeder (ADF) or on platen glass, and then generates image data.

The print unit 10i prints not only an image read by the scan unit 10h, but also an image shown in image data received from other devices, on a paper sheet. A case where a tandem-type color print engine is used as the print unit 10i will be described below as an example.

As shown in FIG. 3, the print unit 10i is formed mainly by includes an imaging part 2, and a transport part 3.

The imaging part 2 is formed by imaging units 21, an intermediate transfer unit 23, and the like.

The imaging units 21 are provided for respective Y (yellow), M (magenta), C (cyan) and K (black) colors, and form toner images of the respective colors.

Here, by taking the yellow imaging unit 21 as an example, a mechanism of the imaging unit 21 will be described.

The imaging unit 21 is formed by a cartridge 211, a photoreceptor drum 212, an electric charger 213, a laser scan optical unit 214, a developing device 215, and the like.

An yellow toner and a carrier are stored in the cartridge 211 by being mixed at a constant ratio.

The electric charger 213 charges the photoreceptor drum 212. The laser scan optical unit 214 performs exposure according to a print target image, thereby generating a yellow electrostatic latent image on the photoreceptor drum 212.

In addition, the developing device 215 puts the yellow toner stored in the cartridge 211 on the photoreceptor drum 212 so as to form a yellow toner image on the photoreceptor drum 212.

The magenta, cyan and black cartridges 211 or the magenta, cyan and black developing devices 215 each play a role similar to that of the yellow cartridge 211 or the yellow developing device 215, and form the magenta, cyan and black toner images respectively.

The intermediate transfer unit 23 synthesizes the yellow, magenta, cyan and black toner images into one toner image as described below.

The intermediate transfer unit 23 is formed by primary transfer rollers 231, an intermediate transfer belt 232, and the like.

The primary transfer rollers 231 are provided corresponding to the respective yellow, magenta, cyan and black colors so as to face the respective color photoreceptor drums 212 across the intermediate transfer belt 232.

Subsequently, electric fields generated by the respective color primary transfer rollers 231 cause the respective color toner images to be transferred to the intermediate transfer belt 232. As the result, the toner image is synthesized.

The transport part 3 is formed by a paper feed tray 31, a paper feed roller 32, a resist roller 33, a secondary transfer roller 34, a heating roller 35, a pressure roller 36, a paper discharge roller 37, and the like. The transport part 3 transports a paper sheet as described below, and fixes the toner image, which has been synthesized on the intermediate transfer belt 232, to a paper sheet.

The paper feed tray 31 stores one or more paper sheets 40, each of which is subjected to image printing. Two or more paper feed trays 31 may be provided. In the present embodiment, two paper feed trays 31 are provided. Hereinafter, the paper feed trays 31 may be distinctively referred to as a "first paper feed tray 31A" and a "second paper feed tray 31B" in order from the top. In addition, it is assumed that the size of paper sheets set in the first paper feed tray 31A differs from the size of paper sheet sets in the second paper feed tray 31B. For example, A4 size paper sheets are set in the first paper feed tray 31A, and A3 size paper sheets are set in the second paper feed tray 31B.

The paper feed trays 31 are provided with the paper feed rollers 32 respectively. The paper feed rollers 32 transport the paper sheet 40 from the respective paper feed trays 31 to the resist roller 33 one by one.

When the paper sheet 40 has been transported by each of the paper feed rollers 32, the resist roller 33 temporarily stops the paper sheet 40, and feeds the paper sheet 40 to the secondary transfer roller 34 in the predetermined timing.

The secondary transfer roller 34 transfers the toner image, which has been synthesized on the intermediate transfer belt 232, onto the paper sheet 40 fed from the resist roller 33.

The heating roller 35 heats the paper sheet 40 on which the toner image has been transferred. The pressure roller 36 pressurizes the paper sheet 40 on which the toner image has been transferred. This causes the toner image to be fixed on the paper sheet 40. In general, the heating roller 35 and the pressure roller 36 may be called "fixing roller".

The paper discharge roller 37 feeds the paper sheet 40 on which the toner image has been fixed to the finisher unit 10j.

Returning to FIG. 2, the finisher unit 10j subjects the paper sheet on which the image has been printed by the print unit 10i, that is to say, a printed matter, to finishing processing to process the paper sheet. Specifically, the finisher unit 10j is formed by a staple device, a punch device, a paper folding device, and the like. In addition, as the finishing processing, one or more of the following processing is performed: processing of binding paper sheets by the staple device (hereinafter referred to as "staple processing"); processing of providing paper sheets with punched holes (hereinafter referred to as "punched hole processing"); and processing of folding paper sheets (hereinafter referred to as "fold finishing performing").

When the paper sheet 40 is transported to the secondary transfer roller 34 by the resist roller 33, the water-content sensor 10k measures the water content of the paper sheet 40. In the present embodiment, a capacitive touch sensor is used as the water-content sensor 10k.

For example, as shown in FIG. 4A, the water-content sensor 10k is formed by a microcomputer 10k1, a touch electrode 10k2, a panel 10k3, a ground plane 10k4, and the like.

The panel 10k3 and the ground plane 10k4 are provided in such a manner that the transport path 39 of the paper sheet 40, which extends from the resist roller 33 to the secondary transfer roller 34, is put between the panel 10k3 and the ground plane 10k4. The touch electrode 10k2 is provided on the back surface of the panel 10k3.

The microcomputer 10k1 calculates water content on the basis of a voltage value input from the touch electrode 10k2. The voltage value depends on capacitance between the touch electrode 10k2 and the ground plane 10k4.

Therefore, when the paper sheet 40 passes therebetween as shown in FIG. 4B, a voltage value corresponding to the paper sheet 40 is input into the microcomputer 10k1. Subsequently, the microcomputer 10k1 calculates the water content of the paper sheet 40 on the basis of the input voltage value.

Before the paper sheet 40 is transported to the secondary transfer roller 34 by the resist roller 33, the paper-kind sensor 10m measures the basic weight, thickness or the like of the paper sheet 40, and determines a kind of paper sheet 40 on the basis of the measured basic weight, thickness or the like. The paper-kind sensor 10m is, for example, an optical sensor for detecting transmitted light that has transmitted through paper.

Returning to FIG. 2, the ROM 10c or the auxiliary storage device 10d stores a print job control program 10P. The print job control program 10P is a program for executing a job that is accompanied with printing. The job accompanied with printing is generically called "print job".

As an example of the print job, the print job includes: a copy job (a job of scanning an image from a paper sheet of an original document, and printing the image on other paper sheets); a PC print job (a job of receiving print data of Page Description Language (PDL) from a terminal device, and printing an image on a paper sheet on the basis of the print data); and a facsimile receiving job (job of receiving facsimile data from a facsimile terminal, and printing an image on a paper sheet on the basis of the facsimile data).

Figure 5:
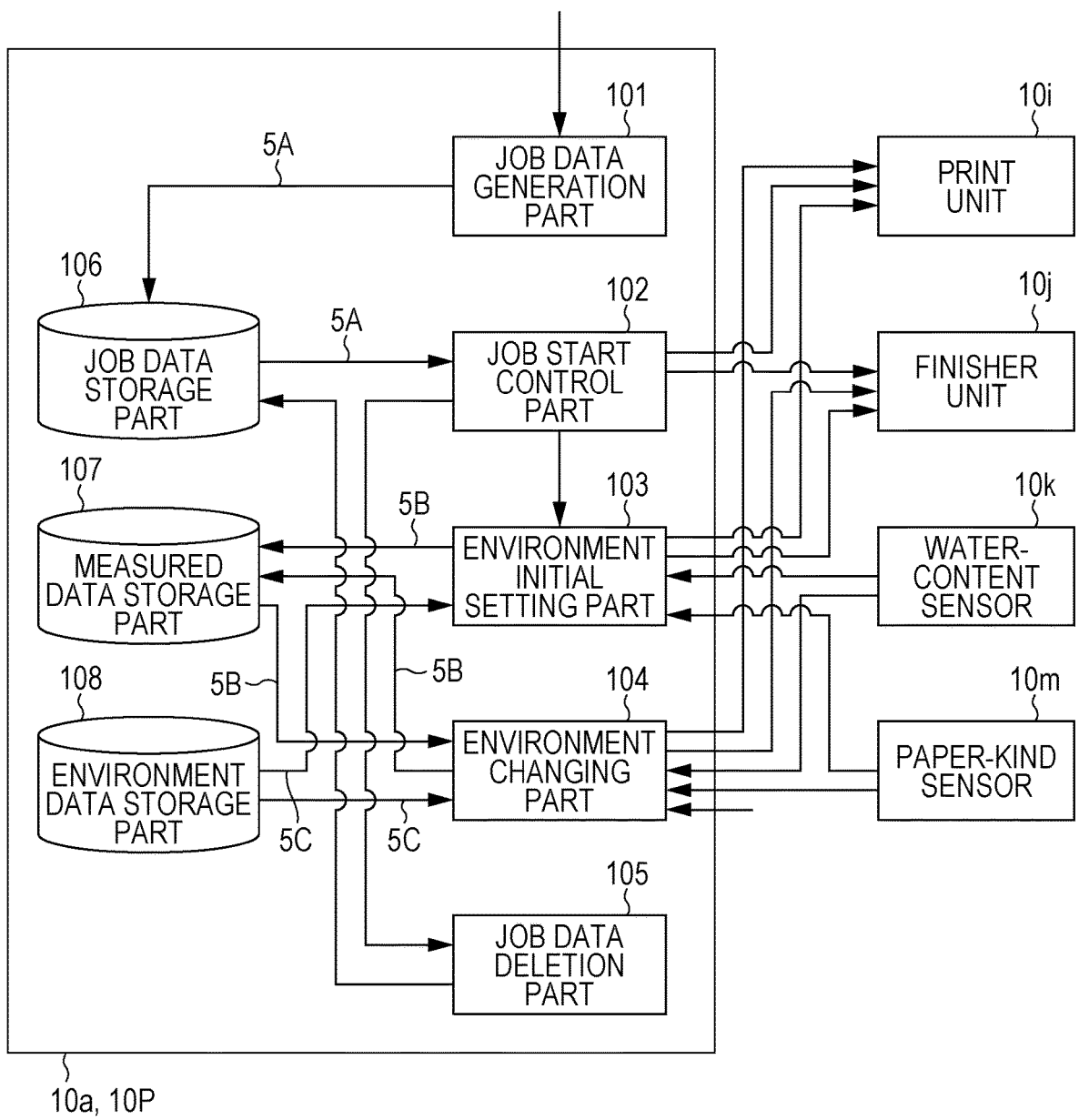
FIG. 5 is a diagram illustrating an example of a functional configuration of the image forming apparatus.
Figure 6:
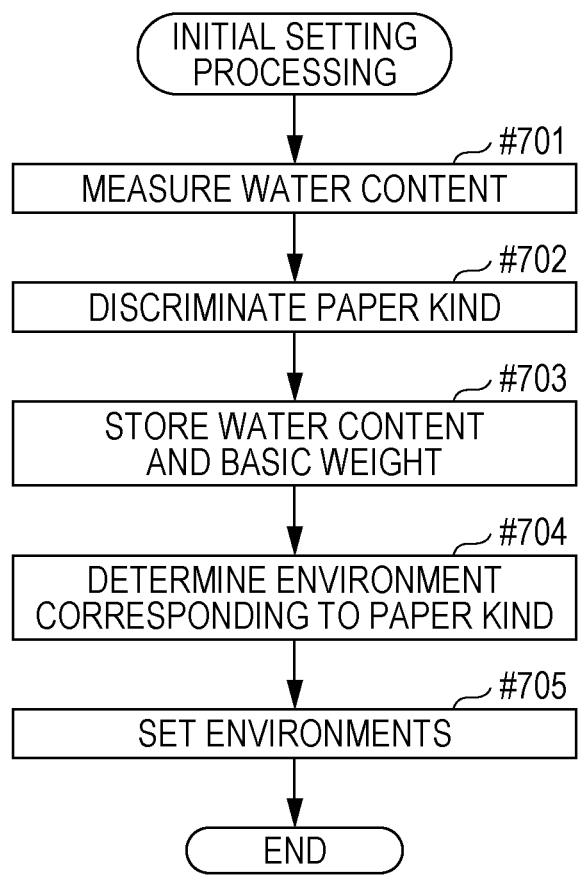
FIG. 6 is a flowchart illustrating an example of an initial setting process flow.
Figure 9:
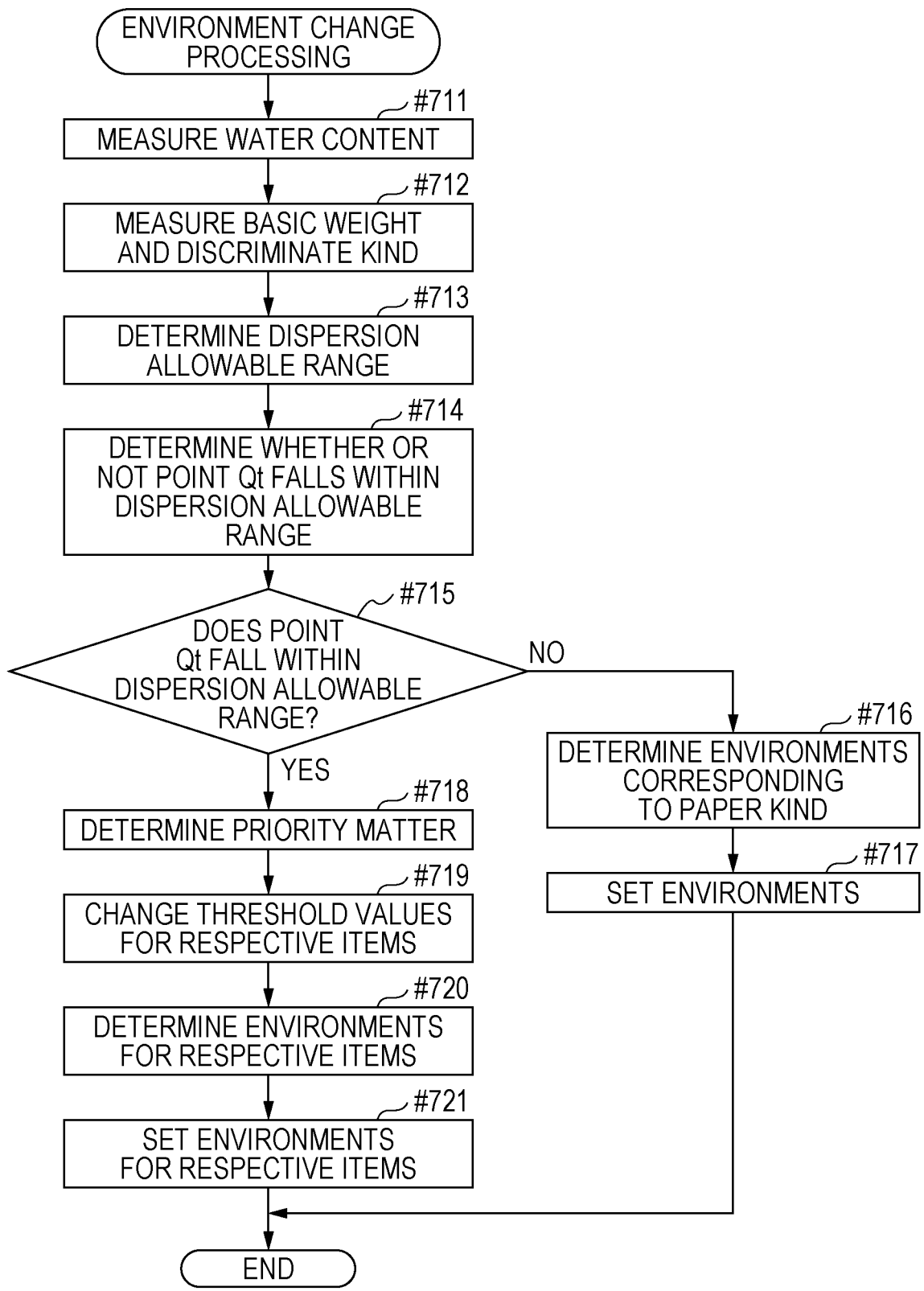
FIG. 9 is a flowchart illustrating an example of an environment change process flow.
Figure 10:
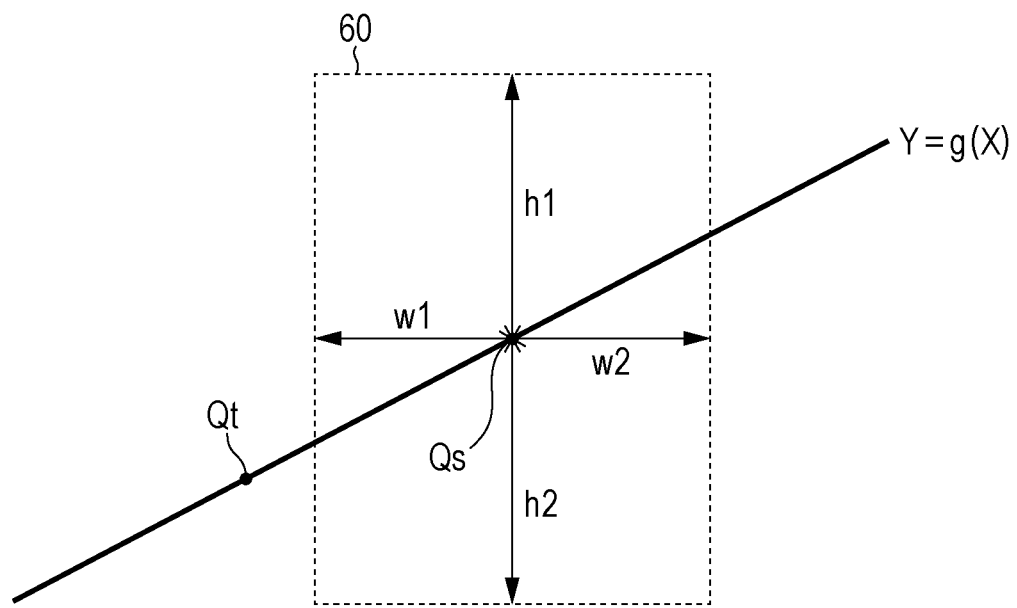
FIG. 10 is a drawing illustrating an example of a dispersion allowable range.
Figure 11A:
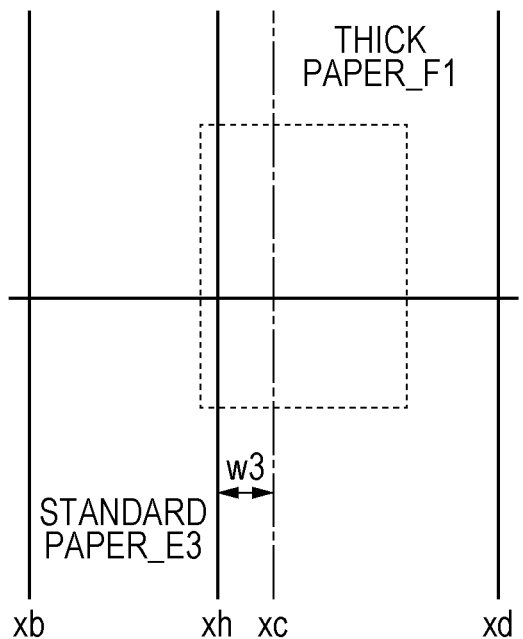
FIGS. 11A and 11B are drawings each illustrating an example of a method for calculating a threshold value.
Figure 11B:
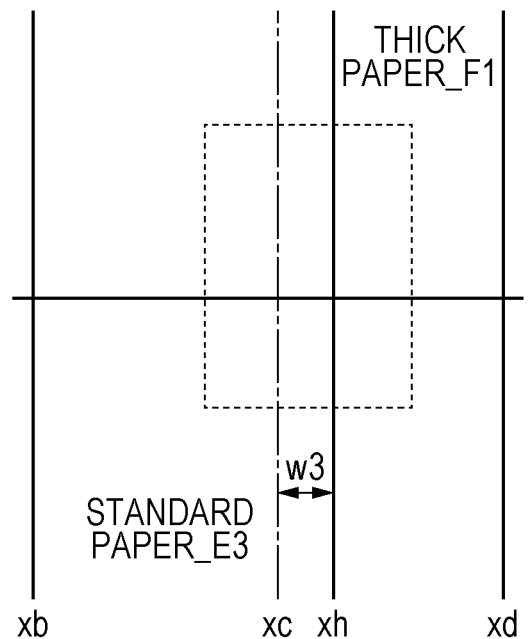
Figure 12:
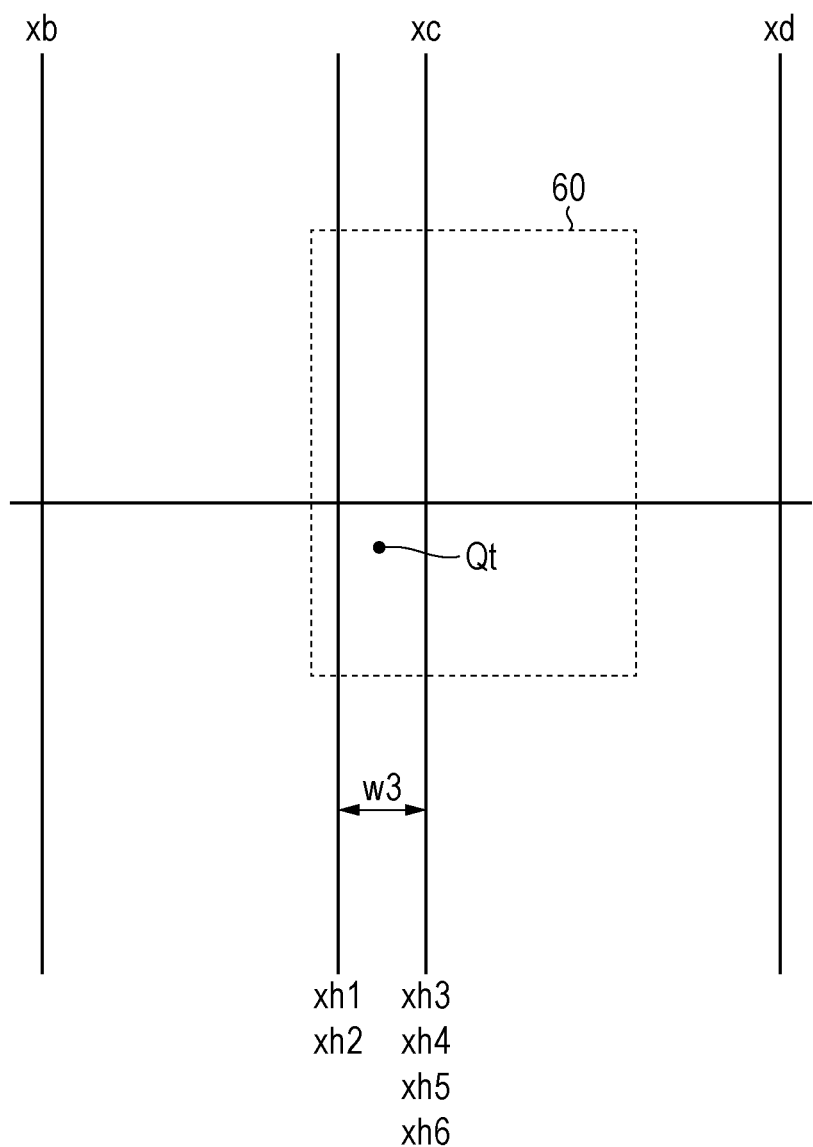
FIG. 12 is a drawing illustrating an example of threshold values for respective items.

FIG. 5 is a diagram illustrating an example of a functional configuration of the image forming apparatus 1. FIG. 6 is a flowchart illustrating an example of an initial setting process flow. FIG. 7 is a drawing illustrating an example of relationship among basic weight of paper sheet, kinds of paper sheet, and threshold values. FIG. 8 is a drawing illustrating an example of environment data 5C. FIG. 9 is a flowchart illustrating an example of an environment change process flow. FIG. 10 is a drawing illustrating an example of a dispersion allowable range 60. FIGS. 11A and 11B are drawings each illustrating an example of a method for calculating a threshold value xh. FIG. 12 is a drawing illustrating an example of threshold values xh1 to xh6 for respective items.

According to the print job control program 10P, a job data generation part 101, a job start control part 102, an environment initial setting part 103, an environment changing part 104, a job data deletion part 105, a job data storage part 106, a measured data storage part 107, and an environment data storage part 108 and the like, which are shown in FIG. 5, are realized in the image forming apparatus 1.

Every time a user instructs a print job, the job data generation part 101 performs, as below according to a kind of the print job, processing of generating data used to print an image.

When a user instructs a copy job, the user sets a paper sheet of an original document in the ADF or platen glass of the scan unit 10h, and inputs a predetermined command into the operation panel 10e.

As the result, the job data generation part 101 causes the scan unit 10h to execute processing of reading an image from the set paper sheet to generate image data, and converts the generated image data into YMCK image data. Subsequently, this YMCK image data and data indicating printing or finishing conditions are stored in the job data storage part 106 as job data 5A by being associated with the date and time at which the command has been input.

It should be noted that as an example of the printing conditions, there can be mentioned a size (paper size) of the paper sheet 40 on which an image is printed, image quality of the image, whether to print the image in color or monochrome, the number of copies, and the like. As an example of the finishing conditions, there can be mentioned presence/absence of staple processing, presence/absence of punched hole processing, presence/absence of fold finishing performing, and the like.

Alternatively, when a user instructs a PC print job, the user prepares data of a printing target document in the terminal device, and inputs the PC print instruction into the terminal device. As the result, the terminal device converts the data into PDL print data, and transmits the PDL print data to the image forming apparatus 1.

When the job data generation part 101 receives the print data from the terminal device, the job data generation part 101 converts this print data into YMCK image data. Subsequently, this YMCK image data and data indicating printing or finishing conditions are stored in the job data storage part 106 as the job data 5A by being associated with the date and time at which the print data has been received.

Alternatively, when an incoming call is received from the facsimile terminal, with the result that facsimile data is received from the facsimile terminal, the job data generation part 101 converts this facsimile data into binary image data. Subsequently, this image data and data indicating printing or finishing conditions are stored in the job data storage part 106 as the job data 5A by being associated with the date and time at which the facsimile data has been received.

When the print unit 10i and the finisher unit 10j are brought into an idling state, the job start control part 102 reads data, the associated date and time of which is the earliest, from among the job data 5A stored in the job data storage part 106, and controls the print unit 10i, the finisher unit 10j or the like in such a manner that the print job is executed on the basis of the read job data 5A.

In this case, which of the first paper feed tray 31A and the second paper feed tray 31B supplies the paper sheet 40 is determined on the basis of the paper size indicated by the job data 5A. In other words, a supplier of the paper sheet 40 is determined.

Before an image is printed on the paper sheet 40, the following processing is executed by the environment initial setting part 103 or the environment changing part 104 as appropriate.

In a case where the paper sheet 40 is supplied from the paper feed tray 31 as the supplier for the first time, the environment initial setting part 103 sets respective environments of the print unit 10i and the finisher unit 10j according to a kind of the paper sheet 40 by using steps shown in FIG. 6.

When the first paper sheet 40 is carried out from the paper feed tray 31, the environment initial setting part 103 causes the water-content sensor 10k to measure water content of the paper sheet 40 (#701 of FIG. 6), and causes the paper-kind sensor 10m to determine a kind of the paper sheet 40 (#702). Measured data 5B is generated, and is then stored in the measured data storage part 107 (#703). In a case where old measured data 5B is already stored in the measured data storage part 107, this measured data 5B is deleted.

In the measured data 5B, the measured water content, and the basic weight measured when the kind is determined, are indicated as measured water content Rs and measured basic weight Xs respectively. Moreover, an identifier of the paper feed tray 31 is indicated.

It should be noted that at the beginning of the operation of the image forming apparatus 1, the measured data 5B is not stored in the environment initial setting part 103.

A case where the paper-kind sensor 10m determines a kind on the basis of the basic weight will be described below as an example. In general, the basic weight of a paper sheet differs depending on a kind. A case where six kinds of paper sheets ("standard paper_E1", "standard paper_E2", "standard paper_E3", "thick paper_F1", "thick paper_F2", and "thick paper_F3" in order of increasing basic weight under predetermined conditions) are used in the image forming apparatus 1 will be described below as an example.

As threshold values for discriminating these six kinds of paper sheets, threshold values xa, xb, xc, xd and xe are stored in the paper-kind sensor 10m beforehand Hereinafter, these threshold values may be designated as "default threshold values". The threshold values xa, xb, xc, xd and xe are fixed values.

In addition, if Sa<xa, the paper-kind sensor 10m determines that the kind of the paper sheet 40 is standard paper_E1. Where "Sa" is the basic weight measured by the paper-kind sensor 10m. If xa≤Sa<xb, the paper-kind sensor 10m determines that the kind of the paper sheet 40 is standard paper_E2. If xb≤Sa<xc, the paper-kind sensor 10m determines that the kind of the paper sheet 40 is standard paper_E3. If xc≤Sa<xd, the paper-kind sensor 10m determines that the kind of the paper sheet 40 is thick paper_F1. If xd≤Sa<xe, the paper-kind sensor 10m determines that the kind of the paper sheet 40 is thick paper_F2. If xe≤Sa, the paper-kind sensor 10m determines that the kind of the paper sheet 40 is thick paper_F3.

In other words, on the assumption that the X-axis represents the basic weight, and the Y-axis represents kinds, a linear function $(Y=g(X)=m \times X+n \ldots (1))$ is set in the paper-kind sensor 10m beforehand Here, m and n are both constants.

Moreover, Y ranges for the respective kinds are set according to the following inequalities (2_1) to (2_6).

$$\text{Standard paper\_E1: } Y<g(xa) \tag{2\_1}$$

$$\text{Standard paper\_E2: } g(xa) \leq Y<g(xb) \tag{2\_2}$$

$$\text{Standard paper\_E3: } g(xb) \leq Y<g(xc) \tag{2\_3}$$

$$\text{Thick paper\_F1: } g(xc) \leq Y<g(xd) \tag{2\_4}$$

$$\text{Thick paper\_F2: } g(xd) \leq Y<g(xe) \tag{2\_5}$$

$$\text{Thick paper\_F3: } g(xe) \leq Y \tag{2\_6}$$

In addition, by substituting the measured basic weight into this linear function, the paper-kind sensor 10m is capable of calculating a Y-value, and consequently is capable of determining a kind of the paper sheet 40 on the basis of the inequalities (2_1) to (2_6).

Incidentally, for each kind of paper sheet, a preferable environment of each of the print unit 10i and the finisher unit 10j is known beforehand. The environment data storage part 108 stores beforehand environment data 5C indicating, on a kind basis, a preferable environment of each of the print unit 10i and the finisher unit 10j.

Specifically, as shown in FIG. 8, the environment data 5C indicates, on a kind basis, condition values of items of: preferable fixing temperature; preferable image parameter; preferable transport speed; maximum number of stapled sheets; maximum number of punched sheets; and maximum number of folded sheets.

The "preferable fixing temperature" is a temperature that should be maintained by the heating roller 35 so as to heat that kind of paper sheet. The "preferable image parameter" is a preferable parameter related to various kinds of matters of an image to be printed on that kind of paper sheet (for example, an increase and a decrease in coverage rate or density). The "preferable transport speed" is a speed that is suitable for transporting that kind of paper sheet.

The "maximum number of stapled sheets" is the maximum number of sheets (that kind of paper sheets) that can be stapled all together. The "maximum number of punched sheets" is the maximum number of sheets (that kind of paper sheets) that can be punched all together. The "maximum number of folded sheets" is the maximum number of sheets (that kind of paper sheets) that can be subjected to fold finishing processing all together.

Return to FIG. 5, the environment initial setting part 103 determines, on the basis of the environment data 5C, the respective environments of the print unit 10*i* and the finisher unit 10*j*, the environments corresponding to the determined kind (#704), and sets the environments in the print unit 10*i* and the finisher unit 10*j* respectively (#705).

For example, in a case where the determined kind is thick paper F1, the environment initial setting part 103 sets environments in the step #705 as described below. The heating roller 35 is controlled in such a manner that the temperature is maintained at T4[° C.] or more. Each of the imaging units 21 is controlled in such a manner that the coverage rate becomes standard U4[%]. The transport part 3 is controlled in such a manner that the paper sheet 40 is transported at P4 [m/s]. The finisher unit 10*j* is controlled in such a manner that staple processing for the paper sheets 40, the number of sheets of which exceeds Ma4 [sheets], is prohibited. The finisher unit 10*j* is controlled in such a manner that punched hole processing for the paper sheets 40, the number of sheets of which exceeds Mb4 [sheets], is prohibited. The finisher unit 10*j* is controlled in such a manner that fold finishing performing for the paper sheets 40, the number of sheets of which exceeds Mc4 [sheets], is prohibited.

Further, print processing or finishing processing is performed by the print unit 10*i* or the finisher unit 10*j* in the environment set by the environment initial setting part 103.

Meanwhile, in a case where the paper sheet 40 has already been supplied from the paper feed tray 31 as the supplier, and immediately after a power source has been switched on, or immediately after the paper feed tray 31 has been closed, the environment changing part 104 sets the respective environments of the print unit 10*i* and the finisher unit 10*j* according to steps shown in FIG. 9.

Immediately after the power source has been switched on, or immediately after the paper feed tray 31 has been closed, when the first paper sheet 40 is carried out, the environment changing part 104 causes the water-content sensor 10*k* to measure the water content of the paper sheet 40 (#711 of FIG. 9), and causes the paper-kind sensor 10*m* to determine a kind of the paper sheet 40 (#712). It should be noted that when the kind is determined, the basic weight of the paper sheet 40 is measured.

According to the water content and the basic weight that have been measured last time, the environment changing part 104 determines the dispersion allowable range 60 as shown in FIG. 10 (#713). It should be noted that the water content and the basic weight are the measured water content Rs and the measured basic weight Xs that are shown in the measured data 5B indicated by an identifier of the paper feed tray 31. The measured data 5B is stored in the measured data storage part 107.

The dispersion allowable range 60 is a rectangular area, and the upper side, the lower side, the right side and the left side are spaced away from a point Qs by distances h1, h2, w1 and w2 respectively. A Y-coordinate value of the point Qs is determined by substituting the measured basic weight Xs into a variable X of the equation (1) (refer to FIG. 7). In other words, the Y-coordinate value of the point Qs is g(Xs).

At least one of the distances h1, h2, w1 and w2 is set at a longer value with the increase in the water content, that is to say, the measured water content Rs, that has been measured last time. In the present embodiment, the respective distances are set by the following equations (3_1) to (3_4). Here, p1 to p4 and q1 to q4 are all positive constants.

$$\text{Distance } h1 = p1 \times Rs + q1 \quad (3\_1)$$

$$\text{Distance } h2 = p2 \times Rs + q2 \quad (3\_2)$$

$$\text{Distance } w1 = p3 \times Rs + q3 \quad (3\_3)$$

$$\text{Distance } w2 = p4 \times Rs + q4 \quad (3\_4)$$

The environment changing part 104 determines whether or not the point Qt falls within the dispersion allowable range 60 (#714). An X-coordinate value of the point Qt is the basic weight measured in the step #712. A Y-coordinate value of the point Qt is determined by substituting the basic weight measured in the step #712 into the variable X of the equation (1). In other words, if the basic weight measured in the step #712 is "Xt", the Y-coordinate value of the point Qt is g(Xt).

In a case where the point Qt does not fall within the dispersion allowable range 60 (No in #715), as with the steps #704 to #705 of FIG. 5, the environment changing part 104 determines respective environments of the print unit 10*i* and the finisher unit 10*j* on the basis of environment data 5C according to the kind determined in the step #712 (#716), and sets the environments in the print unit 10*i* and the finisher unit 10*j* respectively (#717).

Meanwhile, in a case where the point Qt falls within the dispersion allowable range 60 (Yes in #715), the environment changing part 104 determines which matter should have the first priority among the avoidance of damage of a device, the image quality, and the productivity as described below (#718).

The environment changing part 104 calculates the number of jobs N1 and the number of current job sheets N2. The "number of jobs N1" is the number of print jobs that are waiting for print processing, and is the number of job data 5A stored in the job data storage part 106. The "number of current job sheets N2" is the number of paper sheets used in a print job that is currently executing print processing. The number of current job sheets N2 can be determined on the basis of conditions or the like indicated in the job data 5A of the print job. For example, in a case where intensive printing is "OFF" and printing surface is "single side", a determination has only to be made that the product of the number of pages and the number of copies is the number of current job sheets N2.

In addition, in a case where the number of jobs N1 is a threshold value M1 or more and the number of current job sheets N2 is smaller than a threshold value M2, the environment changing part 104 determines that a matter having the first priority is the productivity. In a case where the number of jobs N1 is smaller than the threshold value M1 and the number of current job sheets N2 is smaller than the threshold value M2, it is determined that a matter having the first priority is the image quality. In a case where the number of current job sheets N2 is the threshold value M2 or more irrespective of a value of the number of jobs N1, it is determined that a matter having the first priority is the avoidance of damage of a device.

According to the determined matter having the first priority, the environment changing part 104 determines threshold values xh for the respective items of: the preferable fixing temperature; the preferable image parameter; the preferable transport speed; the maximum number of stapled sheets; the maximum number of punched sheets; and the maximum number of folded sheets (#719). The threshold value xh is used as an alternative to any of the threshold values xa, xb, xc, xd and xe shown in FIG. 7. How to use the threshold value xh will be described later. The respective threshold values of the preferable fixing temperature, the preferable image parameter, the preferable transport speed, the maximum number of stapled sheets, the maximum number of punched sheets and the maximum number of folded sheets will be described below in distinction from the "threshold value xh1", the "threshold value xh2", the "threshold value xh3", the "threshold value xh4", the "threshold value xh5", and the "threshold value xh6".

Here, how to determine the threshold values xh will be described by taking, as an example, a case where the dispersion allowable range 60 extends across the vertical axis L passing through "X=xc", that is to say, the vertical axis that forms the border between the standard paper_E3 and the thick paper_F1.

In a case where the matter having the first priority is the avoidance of damage of a device, as shown in FIG. 11A, the environment changing part 104 determines the threshold values xh to be "xc−w3" for the preferable transport speed, the maximum number of stapled sheets, the maximum number of punched sheets, and the maximum number of folded sheets, among the above-described items. In other words, the threshold values xh3, xh4, xh5 and xh6 are determined to be "xc−w3". However, it is preferable that w3≤w1. It should be noted that a different value may be used as the distance w3 on an item basis. The same applies hereinafter. This makes it easy to apply the environment corresponding to the thick paper F1 for these four items.

Meanwhile, for the preferable fixing temperature and the preferable image parameter, the environment changing part 104 determines the threshold value xh to be the threshold value xc. In other words, the threshold values xh1 and xh2 are determined to be the threshold value xc.

Alternatively, in a case where the matter having the first priority is the image quality, as shown in FIG. 11A, the environment changing part 104 determines the threshold values xh to be "xc−w3" for the preferable fixing temperature and the preferable image parameter. In other words, the threshold values xh1 and xh2 are determined to be "xc−w3". This makes it easy to apply the environment corresponding to the thick paper_F1 for these two items.

Meanwhile, for the preferable transport speed, the maximum number of stapled sheets, the maximum number of punched sheets, and the maximum number of folded sheets, the environment changing part 104 determines the threshold value xh to be the threshold value xc. In other words, the threshold values xh3, xh4, xh5 and xh6 are determined to be the threshold value xc.

Alternatively, in a case where the matter having the first priority is the productivity, as shown in FIG. 11B, the environment changing part 104 determines the threshold value xh to be "xc+w4" for the preferable transport speed. In other words, the threshold value xh3 is determined to be "xc+w4". However, it is preferable that w4≤w2. This makes it easy to apply the environment corresponding to the standard paper_E3 for the preferable transport speed. For the other items, the threshold value xh is determined to be the threshold value xc. In other words, the threshold values xh1, xh2, xh4, xh5 and xh6 are determined to be the threshold value xc. It should be noted that for the preferable fixing temperature as well, the threshold value xh may be determined to be "xc+w4".

On the basis of the environment data 5C (refer to FIG. 8), the environment changing part 104 determines environments for the respective items by using the respective threshold values xh as an alternative to default threshold values included in the dispersion allowable range 60 (#720). In other words, in the examples of FIGS. 11A and 11B, respective environments of the preferable fixing temperature, the preferable image parameter, the preferable transport speed, the maximum number of stapled sheets, the maximum number of punched sheets and the maximum number of folded sheets are determined by using the threshold values xh1, xh2, xh3, xh4, xh5 and xh6 as an alternative to the default threshold values xc.

For example, it is assumed that as the result of the processing in the step #719, as shown in FIG. 12, the threshold values xh1 and xh2 are determined to be "xc−w3", the threshold values xh3, xh4, xh5 and xh6 are determined to be "xc", and g(Xt) is "xc−w3" or more and is smaller than "xc".

In this case, if "xh1" is used as an alternative to "xc" in each of the inequalities (2_3) and (2_4), g(Xt) satisfies the inequality (2_4) between both of the inequalities. The same applies when "xh2" is used.

Accordingly, for a matter related to the heating roller 35 and an image to be printed (for example, an increase and a decrease in coverage rate, density or the like), the environment changing part 104 determines an environment corresponding to the thick paper_F1. In other words, T4[° C.] and U4[%] indicated by the environment data 5C are determined.

In addition, if "xh3" is used, g(Xt) satisfies the inequality (2_4) between both of the inequalities. The same applies when each of "xh4", "xh5" and "xh6" is used.

Accordingly, with respect to the transport speed by the transport part 3, the upper limit of the number of sheets for the staple processing, the upper limit of the number of sheets for the punched hole processing, and the upper limit of the number of sheets for the fold finishing processing, the environment changing part 104 determines the environment corresponding to the standard paper_E3. In other words, P3 [m/s], Ma3 [sheets], Mb3 [sheets], and Mc3 [sheets] indicated by the environment data 5C are determined.

In addition, the environment changing part 104 controls the print unit 10i and the finisher unit 10j in such a manner that the determined environments for the respective items are set (#721).

Subsequently, print processing or finishing processing is performed by the print unit 10i or the finisher unit 10j in the environment set by the environment changing part 104.

The job data deletion part 105 deletes the job data 5A of the completed print job from the job data storage part 106.

Figure 13:
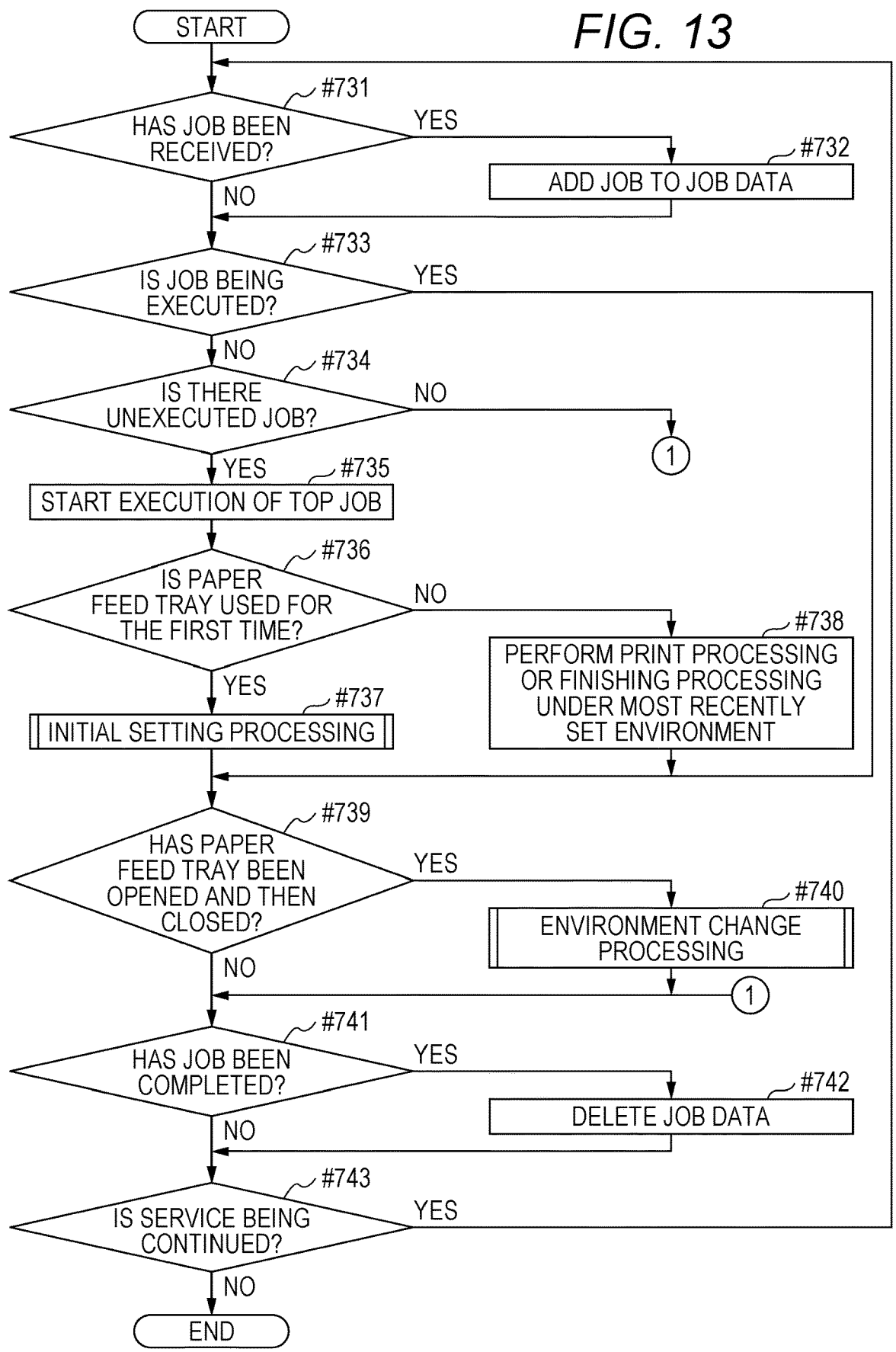
FIG. 13 is a flowchart illustrating an example of an overall process flow related to a print job.

FIG. 13 is a flowchart illustrating an example of an overall process flow related to a print job.

The overall process flow of the image forming apparatus 1 will be described below with reference to the flowchart.

On the basis of the print job control program 10P, the image forming apparatus 1 executes processing according to steps shown in FIG. 13.

When a print job is instructed or print data is received from the terminal device (Yes in #731 of FIG. 13), the image forming apparatus 1 generates the job data 5A, and then stores the job data 5A in the job data storage part 106 (#732).

In a case where although a print job is not being executed (No in #733), one or more of the job data 5A is stored in the job data storage part 106 (Yes in #734), the image forming apparatus 1 starts a print job on the basis of the job data 5A that has been stored in the earliest timing (#735).

In a case where the paper feed tray 31 that is the supplier of the paper sheet 40 is used for the first time (Yes in #736), the image forming apparatus 1 sets respective environments of the print unit 10i and the finisher unit 10j according to a kind of the paper sheet 40 using the steps shown in FIG. 6

(#737). Subsequently, the image forming apparatus 1 performs print processing or finishing processing under the environment.

If not (No in #736), the image forming apparatus 1 performs print processing or finishing processing under the environment that has been most recently set (#738).

When the paper feed tray 31 is opened and is then closed irrespective of whether or not a print job is being executed (Yes in #739), the image forming apparatus 1 sets the respective environments of the print unit 10*i* and the finisher unit 10*j* again according to the water content of the paper sheet 40, the number of jobs N1, the number of current job sheets N2 and the like using the steps shown in FIG. 9 (#740). In a case where the power source is switched on again as well, the environments are similarly set again.

When the print job is completed (Yes in #741), the image forming apparatus 1 deletes the job data 5A of the print job from the job data storage part 106 (#742).

While the service is continued (Yes in #743), the image forming apparatus 1 executes the processing of the step #732, the processing of the step #737, the processing of the step #738, the processing of the step #740, and the processing of the step #742 as appropriate.

According to the present embodiment, in a situation in which the result of detecting a kind easily changes although the same kind of paper sheet is used, an image can be printed on a paper sheet, or a printed matter can be subjected to post-processing, more satisfactorily than heretofore.

In the present embodiment, the environment changing part 104 executes the processing shown in FIG. 9 immediately after the power source has been switched on or immediately after the paper feed tray 31 has been closed. However, the processing may be executed in other timings too. For example, the processing may be executed at the time of first printing after the lapse of the predetermined time every day. Alternatively, the processing may be executed every time a print job is newly added. Alternatively, the processing may be executed every time a print job is completed or canceled.

In the present embodiment, the environment changing part 104 obtains the number of paper sheets (the number of current job sheets N2), which are used in a print job that is executing print processing, as information related to the volume of paper sheets used for this print job. However, other information may be obtained as the volume information. For example, the sum total of thicknesses of all paper sheets used for this print job may be obtained.

In the present embodiment, although the microcomputer 10*k*1 calculates the water content, the water content may be determined by the main CPU 10*a*. In addition, although the paper-kind sensor 10*m* measures the basic weight or thickness of the paper sheet 40, a kind of paper sheet may be determined by the main CPU 10*a*.

In the present embodiment, although the environment changing part 104 determines the size of the dispersion allowable range 60 on the basis of the water content, the environment changing part 104 may determine the size of the dispersion allowable range 60 on the basis of the temperature or humidity of a room in which the image forming apparatus 1 is installed. Alternatively, the size of the dispersion allowable range 60 may be determined on the basis of the temperature or humidity of the print unit 10*i*. For example, the size of the dispersion allowable range 60 may be increased with the increase in humidity. In addition, the size of the dispersion allowable range 60 may be a fixed value independent of the detection by the environment sensor.

In the present embodiment, although the paper-kind sensor 10*m* determines a kind of paper sheet on the basis of the basic weight, the paper-kind sensor 10*m* may determine the kind of paper sheet further on the basis of properties other than the basic weight. For example, the surface roughness (detection by irregular reflection using a camera, a CCD, or an optical sensor) or the thickness (detection using a paper thickness sensor or a displacement sensor) may be detected. In this case, threshold values of respective properties have only to be set for each kind of paper sheet.

Alternatively, besides the light transmittance, a kind of paper sheet may be determined on the basis of the light reflectance or the transmittance or reflectance of ultrasonic waves.

In the present embodiment, the environment changing part 104 determines the threshold value xh1 for determining the temperature (that is to say, the fixing temperature) of the heating roller 35 by the number of jobs N1 and the number of current job sheets N2. However, the threshold value xh1 may be determined further on the basis of the time (the printing time) required for print processing of a print job that is currently being executed. For example, the threshold value xh1 may be decreased with the increase in the printing time. Alternatively, the threshold value xh1 may be determined according to a state in which the paper feed tray 31 is connected to the main body of the image forming apparatus 1, or according to a connection state of the finisher unit 10*j*.

In the present embodiment, the environment changing part 104 unconditionally sets the newly determined environment in the print unit 10*i* or the finisher unit 10*j*. However, the environment changing part 104 may allow a user to select either to set the newly determined environment, or to keep the environment that has been determined by the environment initial setting part 103 or the environment changing part 104 last time.

In the present embodiment, the method for determining conditions of the respective items is changed by changing how to calculate the threshold values xh. However, the method may be changed by preparing a plurality of functions or tables, and by using the functions or tables properly.

Besides the above, the configuration of the whole or part of the image forming apparatus 1, the processing contents, the order of processing, the configuration of data, and the like can be changed as appropriate according to the gist of the present disclosure.

Although embodiments of the present disclosure have been described and illustrated in detail, the disclosed embodiments are made for purposes of illustration and example only and not limitation. The scope of the present disclosure should be interpreted by terms of the appended claims.

As used throughout this application, the words "can" and "may" are used in a permissive sense (i.e., meaning having the potential to), rather than the mandatory sense (i.e., meaning must). The words "include", "including", and "includes" and the like mean including, but not limited to. As used herein, the singular form of "a", "an", and "the" include plural references unless the context clearly dictates otherwise. As employed herein, the term "number" shall mean one or an integer greater than one (i.e., a plurality).

Unless specifically stated otherwise, as apparent from the discussion, it is appreciated that throughout this specification discussions utilizing terms such as "processing," "computing," "calculating," "determining" or the like refer to actions or processes of a specific apparatus, such as a special

What is claimed is:

1. An image forming apparatus that executes a job including printing an image, the image forming apparatus comprising:
   a printer;
   a detector that detects a first property of a printing paper sheet, the printing paper sheet being a paper sheet used by the printer in the printing; and
   a determinator that, on the basis of the first property detected by the detector and a situation of the job, determines conditions for executing the printing, wherein:
   when a difference between a second property detected by the detector last time and the first property is within a predetermined range, the determinator determines the conditions based on the first property and the situation, and
   when the difference is not within the predetermined range, the determinator determines the conditions based on a kind of the printing paper sheet.

2. The image forming apparatus according to claim 1, wherein the determinator determines the conditions on the basis of a number of jobs or a volume of a job that is being executed among the jobs.

3. The image forming apparatus according to claim 2, further comprising:
   a discriminator that discriminates the kind of the printing paper sheet on the basis of which section, among sections predetermined corresponding to respective kinds of paper sheets, includes the first property detected by the detector,
   wherein in a case where the number of jobs and the volume satisfy a predetermined requirement, the determinator (i) calculates a correction section in which a lower limit of the section is decreased to determine that the kind of the printing paper sheet has been most recently discriminated by the discriminator, and (ii) determines the conditions on the basis of the correction section.

4. The image forming apparatus according to claim 3, wherein:
   the section is a section that defines a range of basic weight, and
   the predetermined requirement is that the number of jobs is a predetermined number of jobs or more, and the volume is equal to or larger than a predetermined amount.

5. The image forming apparatus according to claim 2, further comprising:
   a discriminator that discriminates the kind of the printing paper sheet on the basis of a section, and the first property detected by the detector,
   wherein in a case where the number of jobs and the volume satisfy a predetermined requirement, the determinator (i) calculates a correction section in which a lower limit of the section is increased to determine that the kind of the printing paper sheet has been most recently discriminated by the discriminator, and (ii) determines the conditions on the basis of the correction section.

6. The image forming apparatus according to claim 5, wherein:
   the section is a section that defines a range of basic weight, and
   the predetermined requirement is that the number of jobs is a predetermined number of jobs or more, and the volume is smaller than a predetermined amount.

7. The image forming apparatus according to claim 2, further comprising:
   a post-processor that staples paper sheets, including the printing paper sheet on which the image has been printed, processing of forming the paper sheets with punched holes, or processing of folding the paper sheets; and
   a discriminator that discriminates the kind of the printing paper sheet on the basis of a section, and the first property detected by the detector,
   wherein if the number of jobs is a predetermined number of jobs or more and the volume is a predetermined amount or more, the determinator calculates a first correction section in which a lower limit of the section is further decreased, determines the conditions of paper-sheet transport speed on the basis of the first correction section, and determines an upper limit of the number of paper sheets that can be subjected to the post-processing at a time on the basis of the first correction section, if the number of jobs is smaller than the predetermined number of jobs and the volume is smaller than the predetermined amount, the determinator calculates the first correction section, and determines the conditions for a parameter related to the image, and for temperature of a fixing part that fixes a toner image representing the image on a paper sheet, on the basis of the first correction section, and if the number of jobs is the predetermined number of jobs or more and the volume is smaller than the predetermined amount, the determinator calculates a second correction section in which a lower limit of the section is further decreased, and determines conditions of the speed on the basis of the second correction section.

8. The image forming apparatus according to claim 1, wherein the predetermined range is defined more widely with an increase in water content of the printing paper sheet at the time of detecting the second property.

9. The image forming apparatus according to claim 1, wherein the determinator determines the conditions for each of items of: speed at which the printing paper sheet is transported; a parameter related to the image; and temperature of a fixing part that fixes a toner image representing the image on the printing paper sheet.

10. The image forming apparatus according to claim 1, further comprising:
    a post-processor that staples printing paper sheets, including the printing paper sheet on which the image has been printed, forms the printing paper sheets with punched holes, or folds the printing paper sheets,
    wherein, on the basis of the first property detected by the detector and the situation, the determinator determines an upper limit of the number of paper sheets that can be stapled, can be formed with punched holes, or can be folded, all together.

11. The image forming apparatus according to claim 1, wherein, in a case where a paper feed tray that stores paper sheets is opened and closed, or in a case where a power source of the image forming apparatus is switched on again, the determinator determines the conditions.

12. A condition determination method for determining conditions of printing an image by a printer, the printing being included in a job, the condition determination method comprising:

detecting a first property of a printing paper sheet used by the printer in the printing; and determining conditions for executing the printing on the basis of the detected first property and a situation of the job, wherein:

when a difference between a second property detected by the detector last time and the first property is within a predetermined range, the determinator determines the conditions based on the first property and the situation, and when the difference is not within the predetermined range, the determinator determines the conditions based on a kind of the printing paper sheet.

13. A non-transitory recording medium storing a computer readable program used in an image forming apparatus that successively executes jobs, each of which includes printing an image by a printer, the computer readable program causing the image forming apparatus to execute:

detecting a first property of a printing paper sheet used by the printer in the printing; and determining, on the basis of the first property detected by the detecting and a situation of the job, conditions for executing the printing, wherein:

when a difference between a second property detected by the detector last time and the first property is within a predetermined range, the determinator determines the conditions based on the first property and the situation, and when the difference is not within the predetermined range, the determinator determines the conditions based on a kind of the printing paper sheet.

* * * * *